United States Patent
Rambo et al.

(10) Patent No.: US 7,054,805 B2
(45) Date of Patent: May 30, 2006

(54) METHOD AND SYSTEM FOR ALLOCATING MEMORY DURING ENCODING OF A DATASTREAM

(75) Inventors: Darwin Rambo, Surrey (CA); Paul Morton, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 364 days.

(21) Appl. No.: 10/306,195

(22) Filed: Nov. 27, 2002

(65) Prior Publication Data

US 2003/0163328 A1 Aug. 28, 2003

Related U.S. Application Data

(63) Continuation-in-part of application No. 10/087,290, filed on Feb. 28, 2002.

(51) Int. Cl.
*G10L 19/00* (2006.01)
(52) U.S. Cl. ............... 704/201; 382/305; 370/240.26
(58) Field of Classification Search ............... 704/201; 382/305; 709/250; 341/51; 375/240.26
See application file for complete search history.

(56) References Cited

U.S. PATENT DOCUMENTS

| | | | | |
|---|---|---|---|---|
| 5,374,916 A | * | 12/1994 | Chu | .................. 340/146.2 |
| 5,627,533 A | * | 5/1997 | Clark | ..................... 341/51 |
| 5,768,445 A | * | 6/1998 | Troeller et al. | ............. 382/305 |
| 6,310,981 B1 | * | 10/2001 | Makiyama et al. | ......... 382/239 |
| 6,570,926 B1 | * | 5/2003 | Agrawal et al. | ........ 375/240.27 |
| 6,633,608 B1 | * | 10/2003 | Miller | ................ 375/240.02 |

FOREIGN PATENT DOCUMENTS

WO  WO 00/51349  * 8/2000 ............ 375/240.27

* cited by examiner

*Primary Examiner*—Donald L. Storm
(74) *Attorney, Agent, or Firm*—McAndrews, Held & Malloy, Ltd.

(57) ABSTRACT

Certain embodiments of the invention provide a method and system for allocating memory during encoding of an uncompressed information stream. A method for allocating memory during encoding of a uncompressed information stream may include allocating at least a portion of a device memory for storing at least one of an operating data corresponding to the uncompressed information stream and an operating code corresponding to at least one of a plurality of compression algorithms. At least one of the operating data and the operating code may be stored in at least a portion of the allocated device memory. The method may provide selecting at least one of the compression algorithms and encoding at least a portion of the operating data using the selected compression algorithm, resulting in the creation of a compressed information stream.

27 Claims, 2 Drawing Sheets

METHOD AND SYSTEM FOR ALLOCATING MEMORY DURING ENCODING OF A DATASTREAM

CROSS-REFERENCE TO RELATED APPLICATIONS/INCORPORATION BY REFERENCE

This application is a continuation-in-part of U.S. application Ser. No. 10/087,290, filed Feb. 28, 2002. The above application is hereby incorporated by reference in its entirety.

BACKGROUND OF THE INVENTION

Certain embodiments of the present invention relate to the encoding of signals in communication systems. More specifically, certain embodiments relate to a method and system for allocating memory during encoding of a datastream.

Packet based telephony such as Internet Protocol (IP) telephony may provide an alternative to conventional circuit switched telephony, the latter of which may typically require the establishment of an end-to-end communication path prior to the transmission of information. In particular, IP telephony permits packetization, prioritization and simultaneous transmission of voice, video and data traffic without requiring the establishment of an end-to-end communication path. IP telephony systems may capitalize on voice over packet (VoP) technologies, which may provide a means by which voice, video and data traffic may be simultaneously transmitted across one or more packet networks.

Voice quality (VQ) may define a qualitative and/or quantitative measure regarding the quality and/or condition of a received voice signal. Voice clarity may be an indicator of the quality or condition of a voice signal. Voice quality may be an important parameter that may ultimately dictate a quality of service (QOS) offered by a network service provider. The following factors, for example, may affect the voice quality and/or condition of a voice signal—noise, echo, and delay or packet latency. However, the effects of these factors may be cumulative. In this regard, factors such as delay and latency may exacerbate the effects of echo. Delays that may affect the voice quality may include, but are not limited to, routing, queuing and processing delays.

Various VoP specifications, recommendations and standards have been created to ensure interoperability between various network components, and to create an acceptable QOS, which may include voice quality. For example, the International Telecommunications Union (ITU) ratified H.323 specification, which defines the processes by which voice, video and data may be transported over IP networks for use in VoIP networks. H.323 addresses, for example, delay by providing a prioritization scheme in which delay sensitive traffic may be given processing priority over less delay sensitive traffic. For example, voice and video may be given priority over other forms of data traffic.

H.323 also addresses voice quality by specifying the audio and video coders/decoders (CODECs) that may be utilized for processing a media stream. A CODEC may be a signal processor such as a digital signal processor (DSP) that may be adapted to convert an analog voice and/or video signal into a digital media stream and for converting a digital media stream into an analog voice and/or video signal. In this regard, a coder or encoder portion of the CODEC may convert an analog voice and/or video signal into a digital media stream. Additionally, a decoder portion of the CODEC may convert a digital media stream into an analog voice and/or video signal. Regarding the CODEC for audio signals, H.323 may support recommendations such as ITU-T G.711, G.722, G.723.1, G.728 and G.729 recommendations. ITU-T G.711 may support audio coding at 64 Kbps, G.722 may support audio coding at 64 kbps, 56 kbps and 48 Kbps, G.723.1 may support audio coding at 5.3 Kbps and 6.3 Kbps, G.728 may support audio coding at 16 Kbps and G.729 may support audio coding at 8 Kbps.

The voice quality of a speech CODEC may be dependent on factors such as the type of encoding and/or decoding algorithm utilized by the CODEC. In general, some CODECs may utilize compression algorithms that remove redundant information from the analog signal. Such compression algorithms may permit at least a close replication of an original analog signal. In this case, the bandwidth required for transmitting any resultant signal may be reduced. Other CODECs may utilize algorithms that analyze the signal and retain only those portions that are deemed to be of cognitive importance. These algorithms may reproduce a close approximation to the original signal. Notwithstanding, in this latter case, bandwidth utilization may be superior to the former case where redundant information may be removed. Accordingly, depending on application requirements and hardware limitations, one or more algorithms may be utilized to optimize performance.

Moreover, although economic attractiveness of VoP have lured network access providers and network transport providers away from traditional circuit switching networks, factors such as the extensiveness of embedded legacy systems and customer demands, for example, have dictated the coexistence of both packet switched and circuit switch networks. Accordingly, new technologies and techniques such as audio coding and decoding may be required to support various modes of operation utilized by each system.

Encoding an audio, video or data signal typically requires two main types of memory allocation. These may include an encoder instance memory allocation and a compressed voice or data memory allocation. The encoder instance memory may generally contain the state of an encoder, which may include information such as power levels, signal estimates, history, and filter coefficients. Complex encoders such as a G.729 encoder may contain more information in the instance memory than a simple encoder such as G.711. A simple encoder such as a G.711 encoder generally contains compander mode logic and optional packet loss concealment logic. In order to achieve compression, a plurality of basic packets may be encoded to create a compressed packet. In this manner, the size of a compressed packet is a multiple of the size of a basic packet. The larger compressed packet may be called a super-packet. For example, G.711 typically utilizes a basic 40 byte voice payload frame, which may represent five (5) milliseconds (ms) of speech or data. By compressing or chaining a plurality of G.711 basic voice payload frames, various sizes of super-packets may be created. For example, by chaining 2, 3, or 4 G.711 basic voice payloads, super-packets having payloads of 80, 120, or 160 bytes respectively, may be created. These may represent 10, 15, or 20 ms of speech or data respectively.

Basic payload bytes for other encoding schemes may also be compressed to create super packets. For example, G.729 may utilize a basic 10 byte voice payload frame, which may represent ten (10) milliseconds (ms) of speech or data. By compressing or chaining a plurality of G.729 basic voice payload frames, various sizes of super-packets may be created. For example, by chaining 2, 3, or 4 G.711 basic voice payloads, super-packets having payloads of 20, 30, or 40 bytes respectively, may be created. These may represent 20, 30, or 40 ms of speech or data respectively.

In broadband communication and/or high speed communication systems, for example, which may utilize various high density speech processing systems, many channels may be simultaneously active. Since memory is required for tasks such as the simultaneous encoding and decoding these channels, memory is a major system resource that requires optimal handling. Typically, for a range of voice compression algorithms, the more highly compressed the data, the greater the required amount of operating data and the greater the required amount of operating code. Furthermore, a lower bit rate algorithm requires a smaller packet buffer or memory to store a given duration of data. Existing decoders generally allocate a worst-case amount of memory to accommodate voice compression algorithm operating data and/or to accommodate operating code. Additionally, a worst-case amount of memory may also be allocated for packet buffering. In general, scenarios in which these worst-case allocations are applicable do not occur simultaneously. Accordingly, existing memory allocation schemes may not provide the most optimal solutions for allocating memory.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for allocating memory during encoding of an uncompressed information stream. A method for allocating memory during encoding of a uncompressed information stream may include allocating at least a portion of a device memory for storing at least one of an operating data corresponding to the uncompressed information stream and an operating code corresponding to at least one of a plurality of compression algorithms. At least one of the operating data and the operating code may be stored in at least a portion of the allocated device memory. The method may provide selecting at least one of the compression algorithms and encoding at least a portion of the operating data using the selected compression algorithm, resulting in the creation of a compressed information stream.

The encoding step may further including encoding at least a portion of data generated by the operating code with at least a portion of the operating code to create a compressed information stream. The compressed information stream created by encoding at least a portion of the operating data and at least a portion of data generated by the operating code may be any one or a combination of an audio datastream, a video datastream and a data datastream. The compression algorithm may be any one or a combination of an audio compression algorithm, a video compression algorithm and a data compression algorithm.

The allocating step may further include the step of allocating varying amounts of at least a portion of the device memory to store the operating data and the operating code depending on which one of the compression algorithms may be selected. The step of allocating varying amounts of at least a portion of the device memory may further include determining an amount of memory required by the compression algorithm to store at least the operating data and the operating code. The determining step may further include determining an amount of memory required to store an amount of compressed data corresponding to a determined duration of the uncompressed information stream. The method may further include the step of allocating at least a remaining portion of the device memory to store at least a portion of the compressed data corresponding to a determined duration of the uncompressed information stream. At least a portion of the compressed data may be stored in at least a portion of the allocated remaining portion of the device memory.

Another aspect of the invention may also include a machine readable storage, having stored thereon a computer program having at least one code section for allocating memory during encoding of a compressed information stream. The at least one code section may be executable by a machine for causing the machine to perform the steps described above.

Another embodiment of the invention provides a system for allocating memory during encoding of a uncompressed information stream. The system may include at least one allocator adapted to allocate at least a portion of a device memory for storing at least one of an operating data corresponding to the uncompressed information stream and an operating code corresponding to at least one of a plurality of compression algorithms. At least one memory may be adapted to store a least one of the operating data and the operating code allocated by the allocator. At least one selector may be adapted to select at least one of the compression algorithms and at least a portion of the operating data. The selected compression algorithm may be utilized to create a compressed information stream.

The at least one encoder may be further adapted to encode at least a portion of data generated by the operating code with at least a portion of the operating data to create the compressed information stream. The compressed information stream created by the encoder during encoding of at least a portion of the operating data and at least a portion of data generated by the operating code may be any one or a combination of an audio datastream, a video datastream and a data datastream. The compression algorithm may be one or a combination of an audio compression algorithm, a video compression algorithm and a data compression algorithm.

The at least one allocator may be further adapted to allocate varying amounts of the at least one memory to store the operating data and the operating code depending on which one of the compression algorithms has been selected. The at least one allocator adapted to allocate varying amounts of the at least one memory may further include at least one determinator adapted to determine an amount of the at least one memory required by the selected compression algorithm to store at least the operating data and the operating code. The at least one determinator may be further adapted to determine an amount of the at least one memory required to store an amount of compressed data corresponding to a determined duration of the uncompressed information stream. The at least one allocator may be further adapted to allocate at least a remaining portion of the memory to store at least a portion of the compressed data corresponding to a determined duration of the uncompressed information stream. The allocated at least a remaining portion of the at least one memory may be adapted to store at least a portion of the compressed data corresponding to a determined duration of the uncompressed information stream.

Another embodiment of the invention may provide an encoding device for encoding uncompressed data. The encoding device may include an encoder adapted to encode the uncompressed data into a compressed data steam. A memory may be provided to store compressed data and at least one of an operating data and an operating code for a plurality of compression algorithms. Each of the plurality of compression algorithms may require varying amounts of memory to store the operating data, operating code, and/or compressed data corresponding to a predetermined duration of uncompressed data. At least one processor may be adapted to select at least one of the compression algorithms and to allocate an amount of the memory for storing the compressed data and at least one of the operating data and the operating code depending on a selected compression algorithm.

The at least one processor may further include a controller adapted to control the encoding of the uncompressed data into compressed data stored in the allocated amount of memory. The at least one processor may further include a selector adapted to select a selected compression algorithm for encoding the uncompressed datastream. The uncompressed data may be any one or a combination of voice, fax, telephony data, video and audio data.

These and other advantages, aspects and novel features of the present invention, as well as details of an illustrated embodiment thereof, will be more fully understood from the following description and drawings.

DETAILED DESCRIPTION OF THE INVENTION

Aspects of the invention provide a method and system for allocating memory during the encoding of an uncompressed datastream. An embodiment of the invention provides dynamic resizing of a packet buffer utilized for packet encoding based on a selected voice or data compression algorithm. Accordingly, an amount of memory allocated for a compression algorithm operating data, operating code and/or compressed data may be dynamically changed depending on a currently utilized encoding or compression algorithm. For example, dynamic memory allocation may be utilized during an existing telephone call depending on factors such as existing bandwidth requirements of a network over which the compressed voice or data may be delivered. A congested network will likely switch to a lower bit rate encoder such as a G.729, at the expense of voice quality, in order to reduce network traffic.

Figure 1:
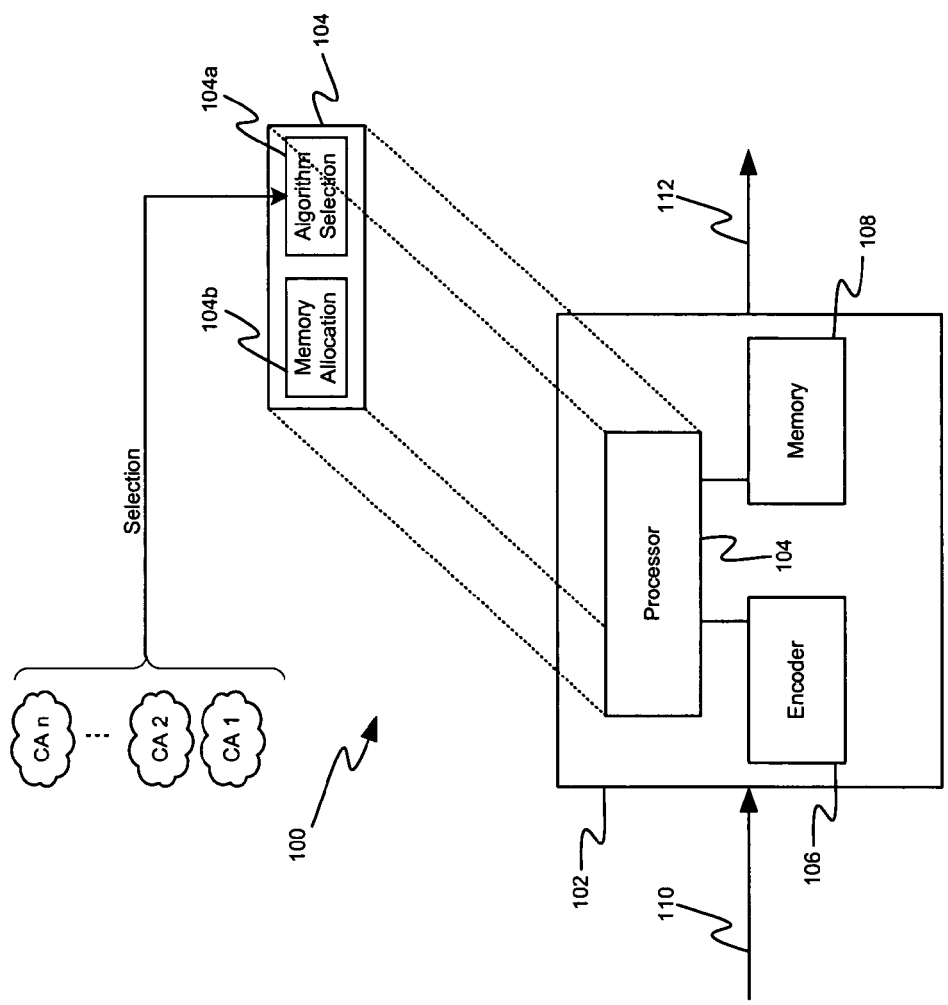
FIG. 1 is a block diagram of an encoding system in accordance with an embodiment of the invention.

An embodiment of the invention provides an encoding system or device having an encoder adapted for encoding uncompressed data into a compressed datastream. FIG. 1 is a block diagram 100 of an encoding system 102 in accordance with an embodiment of the invention. Referring to FIG. 1, the encoding system 102 may include a processor block 104, an encoder block 106 and a memory block 108. The encoding system 102 may be adapted to receive, for example, an incoming uncompressed datastream 110 and produce a compressed output datastream 112. The incoming uncompressed datastream may include, but is not limited, any one or a combination of voice, video, data, and telephony information such as facsimile (fax).

The processor block 104 may be any suitable microprocessor, microcontroller, system-on-Chip (SoC), application specific integrated circuit (ASIC) and/or digital signal processor (DSP) that may be adapted to control the encoding of the incoming uncompressed datastream 110 to produce the compressed output datastream 112. The processor block 104 may be adapted to include at least one encoder algorithm selection function 104a and at least one memory allocation function 104b. The at least one encoder algorithm selection function 104a may be adapted to select at least one compression algorithm (CA) from a plurality of compression algorithms (CA 1, CA 2, . . . CA n) that may be used to compress the incoming datastream. Although the algorithm selection function 104a and the memory allocation function 104b are illustrated as part of the processor block 104, the invention is not limited in this regard. In an embodiment of the invention, one or both of the algorithm selection function 104a and the memory allocation function 104b may be implemented in firmware, software or application code to be executed by the processor block 104.

The at least one memory allocation function 104b may be adapted to dynamically allocate memory depending on, for example, a particular encoder algorithm selected by the memory selection function 104b. The at least one memory allocation function 104b may further be adapted to dynamically resize at least a portion of the memory block 108. Depending on a particular compression algorithm, the at least one memory allocation function may be adapted to allocate varying amounts of memory to store the operating data and/or operating code. Additionally, the at least one memory allocation function 104b may further be adapted to allocate varying amounts of memory to store compressed data corresponding to a determined duration of uncompressed data. While the duration of uncompressed data may be predetermined, the invention is not so limited.

The memory block 108 may be any suitable random access memory (RAM), for example static RAM (SRAM), dynamic (DRAM), double data rate (DDR) RAM or other varieties of RAM. The memory block 108 may be a single memory module or a plurality of coupled memory modules. Notwithstanding, the memory block 108 may be adapted to store any one or more of varying amounts of an operating code, an operating data and compressed data.

The encoder block 106 may be, for example, a specialized encoder integrated circuit (IC) or a digital signal processor that may be adapted to encode the uncompressed incoming datastream into a compressed output datastream. The encoder block may include one or a plurality of digital signal processing elements. In this regard, each of the digital signal processing elements may be adapted to encode data for a particular channel. For example, a particular digital signal processing element in the encoder block 106 may be adapted to encode uncompressed voice data for a particular conversation to create a compressed audio stream. Each of the digital signal processing elements may be dynamically reconfigured to execute at least one of a plurality of encoding algorithms. In this regard, operating code corresponding to the compression algorithm may be dynamically downloaded to any one or more of the digital signal processing elements and executed to implement the algorithm.

In operation, upon receipt of an uncompressed incoming or input datastream 110, the processor block 104 may determine an appropriate compression algorithm that may be utilized for compressing at least a portion of the uncompressed incoming datastream. Accordingly, the algorithm selection block 104a of the processor block 104 may be adapted to select the appropriate compression algorithm to be utilized for compressing the incoming datastream. In one aspect of the invention, operating code corresponding to at the selected compression algorithm may be downloaded to at least one of the digital signal processing elements of encoder block 106. Alternatively, a particular digital signal processing element having an appropriate operating code may be selected to process and compress the incoming datastream.

The memory allocation function 104b of the processor block 104 may allocate at least a portion of memory block 108 for storing at least one of an operating data and operating code for the selected compression algorithm. The memory allocation function 104b may be adapted to determine an amount of memory that may be required for storing operating data and operating code corresponding to the selected compression algorithm. Depending on the compression algorithm selected, the memory allocation function 104b of processor block 104 may be adapted to further determine an amount of memory that may be required for storing compressed data and accordingly allocate at least of remaining portion of the memory block 104 for storing the compressed data.

The at least one digital signal processing element to which the compression algorithm code was downloaded may execute the algorithm code in order to encode the uncompressed incoming datastream to create a compressed datastream. Since each compression algorithm may be adapted to compress an incoming datastream to varying degrees, each the plurality of compression algorithms may require varying amounts of memory to store the operating data, operating code and compressed data. Accordingly, another embodiment of the invention provides for an optimal allocation of memory block 108 by the processor block 104.

Figure 2:
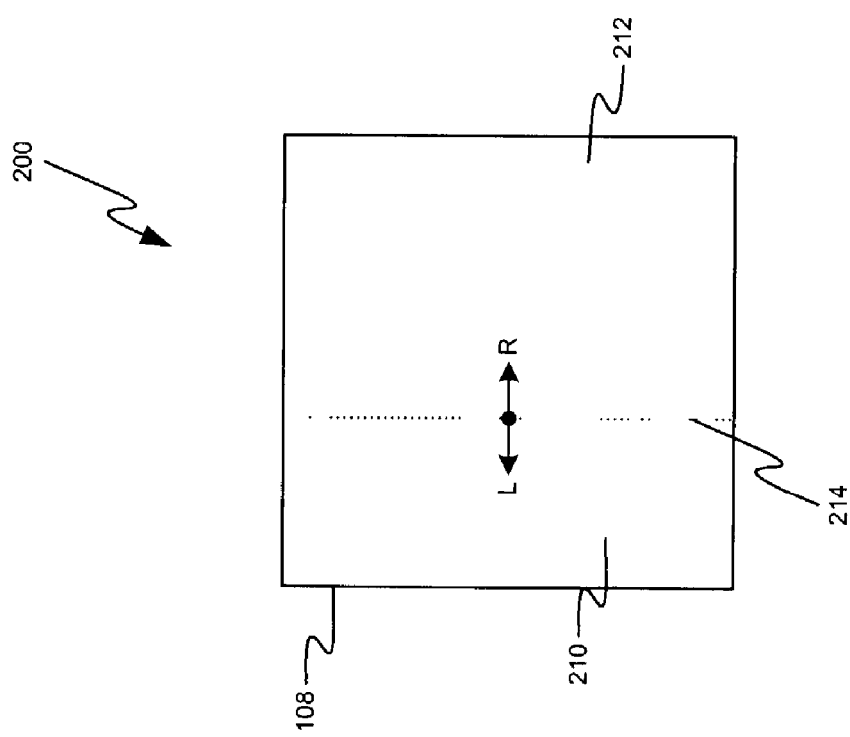
FIG. 2 is a block diagram illustrating the partitioning of the memory of FIG. 1 in accordance with an embodiment of the invention.

FIG. 2 is a block diagram 200 illustrating partitioning of the memory of FIG. 1 in accordance with an embodiment of the invention. Referring to FIG. 1, the memory block 108 is illustrated having at least a virtual partitioner 214. It should be recognized that the virtual partitioner 214 is conceptual and utilized for illustrative purposes. The virtual partition 214 may be adapted to divide the memory block 108 into at least a first memory section 210 and a second memory section 212. The first memory section 210 may be adapted to contain compressed data and the second memory section may be adapted to contain operating code and/or operating data corresponding to a particular algorithm. In this regard, the first memory section 210 may be referred to as a compressed data memory section or super-packet memory section and the second memory section 212 containing operating code and/or operating data may be referred to as an encoder instance memory section. Information such as encoder state, encoder history, power levels and other algorithm related information may utilize the second memory section 212. The second memory section 212 may therefore serve as a scratch-pad area for the encoder block 106.

In accordance with an aspect of the invention, during the memory allocation process, the memory allocation function 104b may be configured to adaptively slide the virtual partitioner 214 to the right (R) or to the left (L) in order to increase or decrease an amount of memory allocated for use by a particular algorithm. For example, in the case of G.729, the virtual partition 214 may be slid to a position such that the encoder instance memory section 212 may be larger than the compressed data memory section 210. This may be due to the fact that G.729 provides greater compression than, for example, G.711, G.729 requires less storage to store compressed data, and G.729 requires a greater scratch-pad area for operating code and operating data. In this regard, the virtual partition 214 may be shifted to the left (L).

In the case of G.711, the virtual partition 214 may be slid to a position such the encoder instance memory section 212 may be smaller than the compressed data memory section. This may be due to the fact that G.711 provides less compression than, for example, G.729, G.711 requires more storage to store compressed data, and G.711 requires a smaller scratch-pad area for operating code and operating data. In this regard, the virtual partition 214 may be shifted to the right (R).

The degree to which the virtual partition 214 may be shifted may be established, for example, by modeling and/or experimentation. Accordingly, in one aspect of the invention, a lookup table containing optimal levels for partitioning memory block 108 into at least a compressed data section 210 and an encoder instance memory section 212 may be created and maintained. During operation, subsequent to the algorithm selection function 104a selecting a particular compression algorithm, the memory allocation function 104b, with knowledge of the particular selected compression algorithm, may consult the lookup table. In this regard, the memory allocation function may be adapted to extract an optimal level for at least a compressed data section and an encoder instance memory section for the selected compression algorithm. While the levels in the lookup table may be static or previously determined, the invention may not be so limited. Accordingly, the levels in the lookup table may be adaptively modified to account for operational variations. Alternatively, a plurality of lookup tables containing levels for various operating conditions may be maintained and a particular table selected dependent on an operational condition.

In one embodiment of the invention, a compile time configuration may be adapted to specify a size of each compression algorithm's super-packet. An encoder algorithm may be adapted to examine possible combinations of encoder instance memory and encoder super-packet size and determine a worst case sum over various encoders to be utilized by a particular encoder configuration. In accordance with the invention, the encoder instance memory may be adapted to be dynamically shifted or modified on the fly upon selection of a particular encoder compression algorithm. This sliding boundary may dramatically optimize memory utilization.

The following illustrates exemplary steps that may be utilized for allocating memory during the encoding an uncompressed datastream in accordance with an embodiment of the invention. Notwithstanding, the invention is not limited by the information provided in exemplary illustrated steps. A G.711 core frame size is 40 bytes and may accommodate about 5 milliseconds (ms) of speech. A G.729 core frame size is 10 bytes and may accommodate about 10 ms of speech. Finally, a G.726–32 core frame size is 20 bytes and may accommodate about 5 ms of speech. For illustrative purposes, it will be assumed that G.711 requires 60 ms of super-packets or 480 byte super-packets, G.729 requires 10 ms super-packets or 10 byte super-packets, and G.726–32 requires 40 ms super-packets or 160 byte super-packets. The following table illustrates an exemplary memory allocation that may be consistent with an exemplary lookup table.

| | Encoder | InstanceMemory (Bytes) | SuperPacket (Bytes) | Required Storage (Bytes) |
|---|---|---|---|---|
| 1. | G.711 | 4 | 480 | 440 |
| 2. | G.729AB | 1428 | 10 | 10 |
| 3. | G.726-32 | 88 | 160 | 160 |

In the three voice coder (vocoder) cases illustrated in the table, an analysis may be made for the union of all three cases. Hence, for G.711, G.711=4+440=444 bytes;

for G.711, G.729AB=1428+0=1428 bytes; and for G.726–32, G.726.32=88+160=248 bytes Accordingly, using a maximum function for the various cases, namely max(444,1428,248), then 1428 bytes may be allocated for the shared encoder instance memory and super-packet memory pool. In prior art systems that utilize a worst case encoder plus worst case super-packet analysis, this would lead to a usage of (1428+440)=1868 bytes total. The invention therefore provides an instant savings of approximately (1868−1428)=440 bytes. This saving in instance memory can have a significant effect on a per channel and/or a per chip basis, especially in high density speech processing systems which contains many signal processing elements for processing hundreds and even thousands of channels.

In accordance with another embodiment of the invention, the processor block 104 may be adapted to examine the various combinations at compile time, and determine a worst case allocation over all encoders. At runtime, the memory block 108 may be viewed as a shared resource pool, and upon activation of a new encoder, the memory allocation function 104b of the processor block 104 may determine a new boundary for the encoder instance memory section and super-packet memory section. In this regard, elements of the lookup table, which may be determined, for example, at compile time, may be utilized at runtime to establish the virtual level for the virtual partitioner 214.

In another aspect of the invention, the processor block 102 may be adapted to implement a sliding window approach and recognize that a packet buffer may occupy memory while being built, so that the packet buffer may be placed in a persistent memory for each channel. This may ensure encoding of the packet buffer over several speech frames. For example, a 30 ms G.711 super-frame may be required to run over about six (6) 5 ms frames in order to be built. In another aspect of the invention, it may not be necessary to store an entire super-packet since the last frame may be encoded into non-persistent memory, thereby significantly saving memory and increasing memory utilization. In the case of the G.711 vocoder in the above table, if a core encoder packet size, for example, 40 bytes for G.711 at 5 ms, and 40 ms super-packet or 320 bytes has been defined, for example, then only 280 bytes may be required to be stored in the instance memory since last encode of 40 bytes can be done in scratch or stack memory. The last encode of 40 bytes does not have to be accomplished in persistent memory, since this last encode completes the super-packet and the super-packet can be sent immediately. This may result in additional savings over the original sliding window approach.

Accordingly, the present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for allocating memory during encoding of a uncompressed information stream, the method comprising:
selecting one of a plurality of compression algorithms;
allocating at least a portion of a device memory for storing operating data corresponding to the uncompressed information stream and operating code corresponding to said plurality of compression algorithms;
storing said operating data and said operating code in said allocated at least a portion of said device memory; and
encoding at least a portion of said operating data using said selected one of said plurality of compression algorithms to create a compressed information stream.

2. The method according to claim 1, wherein said encoding further comprises encoding at least a portion of data generated by said operating code with at least a portion of said operating code to create a compressed information stream.

3. The method according to claim 2, wherein said compressed information stream created by said encoding of said at least a portion of said operating data and by said encoding of said at least a portion of data generated by said operating code is at least one of:
an audio datastream,
a video datastream, and
a datastream.

4. The method according to claim 2, wherein said plurality of compression algorithms is at least one of:
an audio compression algorithm,
a video compression algorithm, and
a data compression algorithm.

5. The method according to claim 1, wherein said allocating further comprises allocating varying amounts of said at least a portion of said device memory to store said operating data and said operating code depending on said selected one of said plurality of compression algorithms.

6. The method according to claim 5, wherein said allocating varying amounts of said at least a portion of said device memory further comprises determining an amount of memory required by said selected one of said plurality of compression algorithms to store at least said operating data and said operating code.

7. The method according to claim 6, wherein said determining further comprises determining an amount of memory required to store an amount of compressed data corresponding to a determined duration of the uncompressed information stream.

8. The method according to claim 7, further comprising allocating at least a remaining portion of said device memory to store at least a portion of said compressed data corresponding to a determined duration of the uncompressed information stream.

9. The method according to claim 8, further comprising storing at least a portion of said compressed data in at least a portion of said allocated remaining portion of said device memory.

10. A machine-readable storage, having stored thereon a computer program having at least one code section for allocating memory during encoding of a uncompressed information stream, the at least one code section executable by a machine for causing the machine to perform the steps comprising:
selecting one of a plurality of compression algorithms;
allocating at least a portion of a device memory for storing operating data corresponding to the uncompressed information stream and operating code corresponding to said plurality of compression algorithms;
storing said operating data and said operating code in said allocated at least a portion of said device memory; and encoding at least a portion of said operating data using said selected one of said plurality of compression algorithms to create a compressed information stream.

11. The machine-readable storage according to claim 10, wherein said at least one code section for encoding further comprises code for encoding at least a portion of data generated by said operating code with at least a portion of said operating code to create a compressed information stream.

12. The machine-readable storage according to claim 11, wherein said compressed information stream created by said encoding of said at least a portion of said operating data and by said encoding of said at least a portion of data generated by said operating code is at least one of:
an audio datastream,
a video datastream, and
a datastream.

13. The machine-readable storage according to claim 11, wherein said plurality of compression algorithms is at least one of:
an audio compression algorithm,
a video compression algorithm, and
a data compression algorithm.

14. The machine-readable storage according to claim 10, wherein said at least one code section for allocating further comprises code for allocating varying amounts of said at least a portion of said device memory to store said operating data and said operating code depending on said selected one of said plurality of compression algorithms.

15. The machine-readable storage according to claim 14, wherein said code for allocating varying amounts of said at least a portion of said device memory further comprises code for determining an amount of memory required by said selected one of said plurality of compression algorithms to store at least said operating data and said operating code.

16. The machine-readable storage according to claim 15, wherein said code for determining further comprises code for determining an amount of memory required to store an amount of compressed data corresponding to a determined duration of the uncompressed information stream.

17. The machine-readable storage according to claim 16, further comprising code for allocating at least a remaining portion of said device memory to store at least a portion of said compressed data corresponding to a determined duration of the uncompressed information stream.

18. The machine-readable storage according to claim 17, further comprising code for storing at least a portion of said compressed data in at least a portion of said allocated remaining portion of said device memory.

19. A system for allocating memory during encoding of a uncompressed information stream, the system comprising:
at least one selector adapted to select one of a plurality of compression algorithms;
at least one allocator adapted to allocate at least a portion of a device memory for storing operating data corresponding to the uncompressed information stream and operating code corresponding to said plurality of compression algorithms;
at least one memory adapted to store said operating data and said operating code allocated by said allocator; and
at least one encoder adapted to encode at least a portion of said operating data using said selected one of said plurality of compression algorithms to create a compressed information stream.

20. The system according to claim 19, wherein said at least one encoder is further adapted to encode at least a portion of data generated by said operating code with at least a portion of said operating code to create a compressed information stream.

21. The system according to claim 20, wherein said compressed information stream created by said encoder during encoding of said at least a portion of said operating data and by said encoder during encoding of said at least a portion of data generated by said operating code is at least one of:
an audio datastream,
a video datastream, and
a datastream.

22. The system according to claim 20, wherein said plurality of compression algorithms is at least one of:
an audio compression algorithm,
a video compression algorithm, and
a data compression algorithm.

23. The system according to claim 19, wherein said at least one allocator is further adapted to allocate varying amounts of said at least one memory to store said operating data and said operating code depending on said selected one of said plurality of compression algorithms.

24. The system according to claim 23, wherein said at least one allocator adapted to allocate varying amounts of said at least one memory further comprises at least one determinator adapted to determine an amount of said at least one memory required by said selected one of said plurality of compression algorithms to store at least said operating data and said operating code.

25. The system according to claim 24, wherein said at least one determinator is further adapted to determine an amount of said at least one memory required to store an amount of compressed data corresponding to a determined duration of the uncompressed information stream.

26. The system according to claim 25, wherein said at least one allocator is further adapted to allocate at least a remaining portion of said memory to store at least a portion of said compressed data corresponding to a determined duration of the uncompressed information stream.

27. The system according to claim 26, wherein said allocated at least a remaining portion of said memory is further adapted to store at least a portion of said compressed data corresponding to said determined duration of the uncompressed information stream.

* * * * *